R. J. LYMAN.
CIRCUIT CLOSER FOR VEHICLE SIGNALS.
APPLICATION FILED APR. 1, 1918.
1,331,019. Patented Feb. 17, 1920.
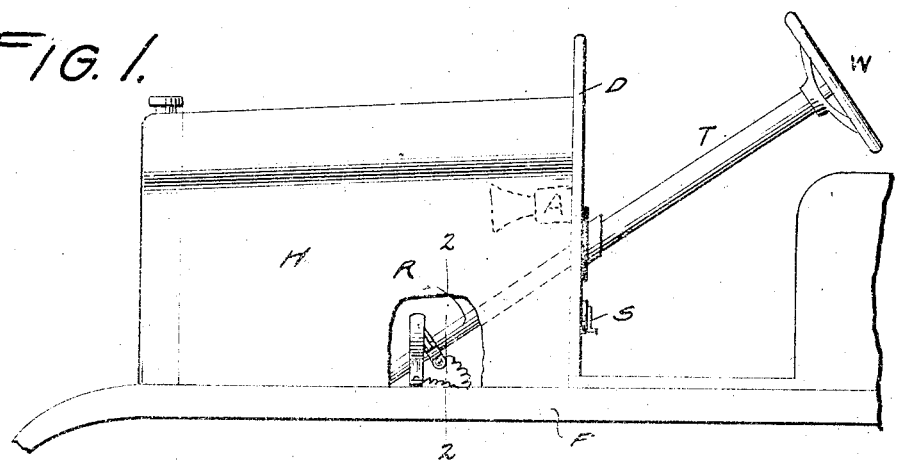
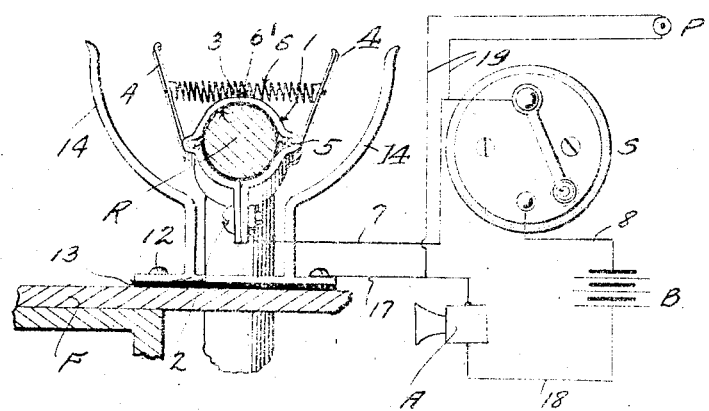
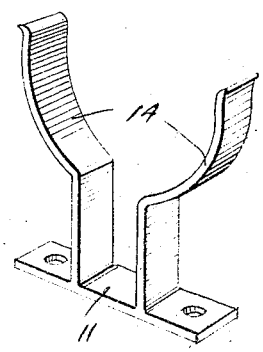
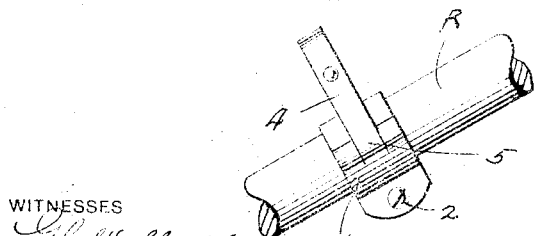
INVENTOR
RICHARD J. LYMAN
WITNESSES
BY
ATTORNEY

UNITED STATES PATENT OFFICE.

RICHARD JEWELL LYMAN, OF KAPOHO, PUNA, TERRITORY OF HAWAII.

CIRCUIT-CLOSER FOR VEHICLE-SIGNALS.

1,331,019.     Specification of Letters Patent.     Patented Feb. 17, 1920.

Application filed April 1, 1918. Serial No. 226,054.

*To all whom it may concern:*

Be it known that I, RICHARD J. LYMAN, a citizen of the United States, residing at Kapoho, Puna, in the Territory of Hawaii, have invented certain new and useful Improvements in Circuit-Closers for Vehicle-Signals, of which the following is a specification.

This invention relates to electricity, and more especially to circuit closers; and the object of the same is to produce an improved type of circuit closer, for application to the steering rod of an automobile so that an audible signal thereon will be sounded whenever the steering wheels are turned a predetermined distance to either right or left.

The invention produces an automatic signal mechanism for motor vehicles whereby a signal such as a horn is sounded each time the driver changes his course from a straight path, thus giving warning to pedestrians and others who are not directly ahead of this machine of his intention to turn to the right or left.

Details of the preferred embodiment of my invention will be found in the following specification, reference being made to the drawings, wherein:—

Figure 1 is a side elevation of the front portion of a machine with this invention applied, Fig. 2 is an enlarged cross section on the line 2—2 of Fig. 1 and a diagram of the electric wiring, Fig. 3 is a perspective view of the yoke whose arms constitute one terminal, Fig. 4 is an enlarged side elevation of the collar and fingers which constitute the other terminal.

I have designated the ordinary parts of an automobile by letters. H is the hood forward of the dash, A an audible signal of any appropriate character such as a horn driven or sounded by an electric motor contained therein, T the fixed steering tube, R the steering rod extending therethrough and carrying the wheel W at its upper end, B is a battery or other source of electric power, P is a push button, and S a switch. No novelty is claimed for these several instrumentalities, most of which are mounted on the dash D or the frame F of an ordinary motor vehicle.

Coming now to the invention itself, the numeral 1 designates a metallic collar secured around the steering rod R by suitable means such as a screw 2 and maintained out of contact with said rod by insulation as indicated at 3, and 4, 4 are fingers hingedly mounted at 5 on the sides of this collar and pressed normally apart by a spring 6 interposed between them so that they stand ordinarily in the position best seen in Fig. 2. The spring 6 is fixed intermediate its ends upon the collar 1 by a drop or two of solder as shown at 6' whereby the spring will be held against shifting, whereby it will constitute a yieldable support for the fingers 4. A wire 7 leads from the collar 1 to the switch or circuit breaker S, and from this point another wire 8 leads to the battery B.

The numeral 11 designates a plate secured in any suitable manner upon the frame F as by screws 12, and insulated therefrom as at 13, and rising from this plate is a yoke consisting of arms, 14, 14 preferably curved as best seen at Fig. 2 and standing just outside the fingers 4. A wire 17 leads from the base plate to the horn or other signal A, and from the latter a wire 18 leads to the other side of the battery B. A shunt circuit 19 may lead from the two wires 7 and 17 to a push button P so that pressure on the latter has the same effect as contact of the terminals described below, and this will give the operator the privilege of sounding his alarm manually while the machine is progressing straight ahead. When the switch S is open, the alarm is of course cut out.

With this construction, the operation is as follows:—

Whenever the driver manipulates the wheel W and turns the steering rod R to such an extent that the steering wheels are turned aside more than say 20°, the oscillation of the rod R carrying with it the collar 1 throws one finger or the other into contact with the contiguous arm of the yoke. The tip of the finger strikes the dished inner face of this arm and moves down the same, the finger yielding as the spring 6 permits. There is thus produced a wiping contact between the tip of the finger and the inner face of the arm, and a circuit is closed so that the alarm is sounded, and this alarm continues sounding so long as the steering wheels are deflected to the extent suggested or to whatever extent produces an alarm, according to the disposition of the arms 14. Therefore any pedestrian or other person who may not be directly ahead of the automobile and would not otherwise pay much attention to it, is notified that the driver is about to turn to one side or the other, and thus mechanically and automatically advised of impending danger. As soon as the driver again straightens out on his course, the alarm ceases to act. Meanwhile if the shunt circuit and push button P are employed, the driver may at any time sound the same signal irrespective of the action of the automatic circuit closer. I do not wish to be limited to details of construction further than as set forth below.

What is claimed as new is:—

1. In a circuit closer of the type described, the combination with a collar adapted for insulated attachment to an oscillating shaft and adapted to be connected with one side of a circuit containing an alarm and a source of electric energy, outwardly divergent fingers hingedly mounted on said collar, and a spring fixed upon said collar and yieldably engaging said fingers; of a yoke adapted for insulated attachment to a fixed support beneath said shaft and adapted to be connected with the other side of said circuit, the arms of the yoke diverging from each other on curved lines and standing in the path of movement of the tips of said fingers, for the purpose set forth.

2. In a circuit closer of the type described, the combination with a collar adapted for insulated attachment to an oscillating shaft and adapted to be connected with one side of a circuit containing an alarm and a source of electric energy, fingers hinged at their inner ends to opposite sides of the collar and diverging outwardly, and an expansive spring fixed upon said collar and yieldably engaging said fingers; of a yoke carried by and insulated from a fixed support and adapted to be connected with the other side of said circuit, the arms of the yoke standing in the path of movement of the tips of said fingers, for the purpose set forth.

In testimony whereof I affix my signature in presence of two witnesses,

RICHARD JEWELL LYMAN.

Witnesses:
Mrs. HENRY J. LYMAN,
JEANNETTE LYONS.